(12) United States Patent
Elkin et al.

(10) Patent No.: US 8,454,313 B2
(45) Date of Patent: Jun. 4, 2013

(54) INDEPENDENT VARIABLE BLADE PITCH AND GEOMETRY WIND TURBINE

(76) Inventors: Benjamin T. Elkin, Marion Center, PA (US); Brent T. Elkin, Imlay City, MI (US)

( * ) Notice: Subject to any disclaimer, the term of this patent is extended or adjusted under 35 U.S.C. 154(b) by 729 days.

(21) Appl. No.: 12/541,603

(22) Filed: Aug. 14, 2009

(65) Prior Publication Data

US 2011/0038728 A1 Feb. 17, 2011

(51) Int. Cl.
*F03D 1/02* (2006.01)
*F03D 7/02* (2006.01)

(52) U.S. Cl.
USPC ..... 416/132 B; 416/140; 416/141; 416/210 R

(58) Field of Classification Search
USPC .............. 416/132 B, 132 R, 141, 210 R, 136, 416/140, 169 R
See application file for complete search history.

(56) References Cited

U.S. PATENT DOCUMENTS

| D252,877 S | 9/1979 | Hanson |
| 5,506,453 A * | 4/1996 | McCombs ...................... 290/44 |
| 6,933,625 B2 | 8/2005 | Feddersen et al. |
| 7,131,812 B2 * | 11/2006 | Brueckner ..................... 415/4.3 |
| 7,186,083 B2 * | 3/2007 | Bayly .............................. 416/51 |
| 7,393,180 B2 * | 7/2008 | Von Mutius .............. 416/132 B |
| 2005/0042101 A1 * | 2/2005 | Hur .......................... 416/132 B |

FOREIGN PATENT DOCUMENTS

DE 19730211 A1 * 12/1997
WO WO 2005064156 A1 * 7/2005

* cited by examiner

*Primary Examiner* — Edward Look
*Assistant Examiner* — Jesse Prager
(74) *Attorney, Agent, or Firm* — Young Basile

(57) ABSTRACT

A variable blade pitch wind turbine and method of passively varying the blade pitch is presented. Each blade of the turbine rotor can individually and passively rotate about a respective blade axis to continuously vary the pitch of the blades to adjust to the ever changing wind speed and direction without active controls or other mechanical or electrical induced inputs to force rotational movement of the blades. Sections of each blade can respectively rotate to change the blade twist. In one example, a second rotor is used to increase the electrical generation and efficiency of the blade turbine.

18 Claims, 6 Drawing Sheets

INDEPENDENT VARIABLE BLADE PITCH AND GEOMETRY WIND TURBINE

TECHNICAL FIELD

The general field of invention is alternative energy.

BACKGROUND

There has long been motivation for alternative energy sources to reduce the dependency on non-renewable energy sources such as oil and coal. There has long been interest in harnessing wind to generate electricity particularly in areas with a high or relatively continuous stream of wind energy.

There have been challenges and previously proposed solutions for harnessing wind energy through use of electric wind turbines. These large windmill-type structures suffer from many disadvantages including, the ability to adjust to variable wind conditions in either or both of direction or velocity. Additional disadvantages of prior wind turbines include relatively low efficiency rates due to standard designs that are employed in environments not suitable for the particular wind turbine design or initial set-up. Due to the size and mass of large wind turbines, premature structural fatigue and failure of components occur. Prior wind turbines also suffer from inefficient and complex designs.

Thus it is desirable to improve on prior wind turbine designs to increase the turbine's ability to harness the wind energy, improve the efficiency in converting the wind energy to electricity and to simplify and improve their design, manufacturing and operation.

BRIEF SUMMARY

The present invention relates to electric wind turbines and methods for varying the pitch of the rotor blades to better adapt to changing wind conditions and increase the capture of wind energy. One method of varying the pitch involves varying the twist of the rotor blade as discussed in more detail herein.

In one example of the wind turbine invention, a first or front rotor and a second or rear rotor are used on opposing ends of the power transmission housing or nacelle. In alternate examples of this invention, the rotor blades include separate blade sections that are able to freely rotate relative to each section through a predetermined range to accommodate different wind speeds and conditions at different positions along the path of rotation.

In an alternate example, the individual rotor blade supports extend from a central hub and are able to independently rotate about the blade support axis to independently and/or passively change the rotational position of the entire blade to better adapt to different wind speeds or changing wind conditions.

In an another example, both the separate sections of the individual rotor blade and the rotor blade support are able to rotate through predetermined ranges to further increase the adaptability of the wind turbine to the wind conditions.

In an alternate example of a two rotor design, the first rotor blades are not as long as the blades on the down wind second rotor blades and provide an increased ability to harness the wind energy for increased electrical output and efficiency.

In alternate examples where only a single rotor is used, the above mentioned examples of utilizing separate blade sections passively rotatable with respect to each section and/or passive rotation of the blade support relative to a central hub may be used depending on the geographic location and anticipated climate conditions.

The invention further includes a variable pitch wind turbine rotor blade that passively adjusts the blade pitch to better adapt to the immediate wind conditions confronting the blade. The change or variation in pitch, in one example, uses separate blade sections that are independently rotatable with respect to the blade support such that the change in rotation of the separate blade sections alters the blade twist. In another example, the blade sections are rotatable with respect to other blade section(s). In a third example, the blade support is freely rotatable with respect to a hub to change the pitch of a portion of the blade or the entire blade.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
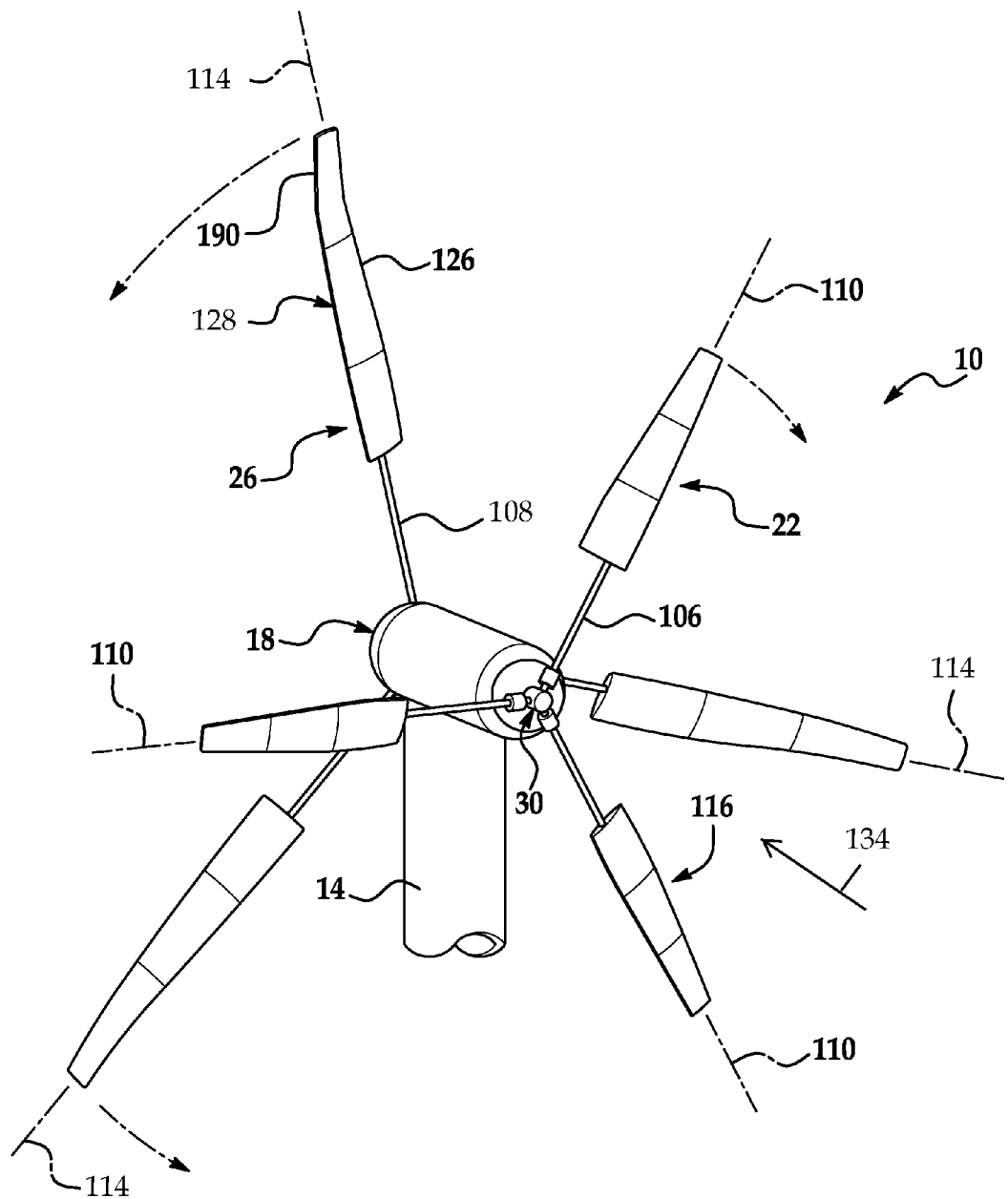
FIG. 1 is a partial perspective view of one example of the invention where two rotors are used.
Figure 2:
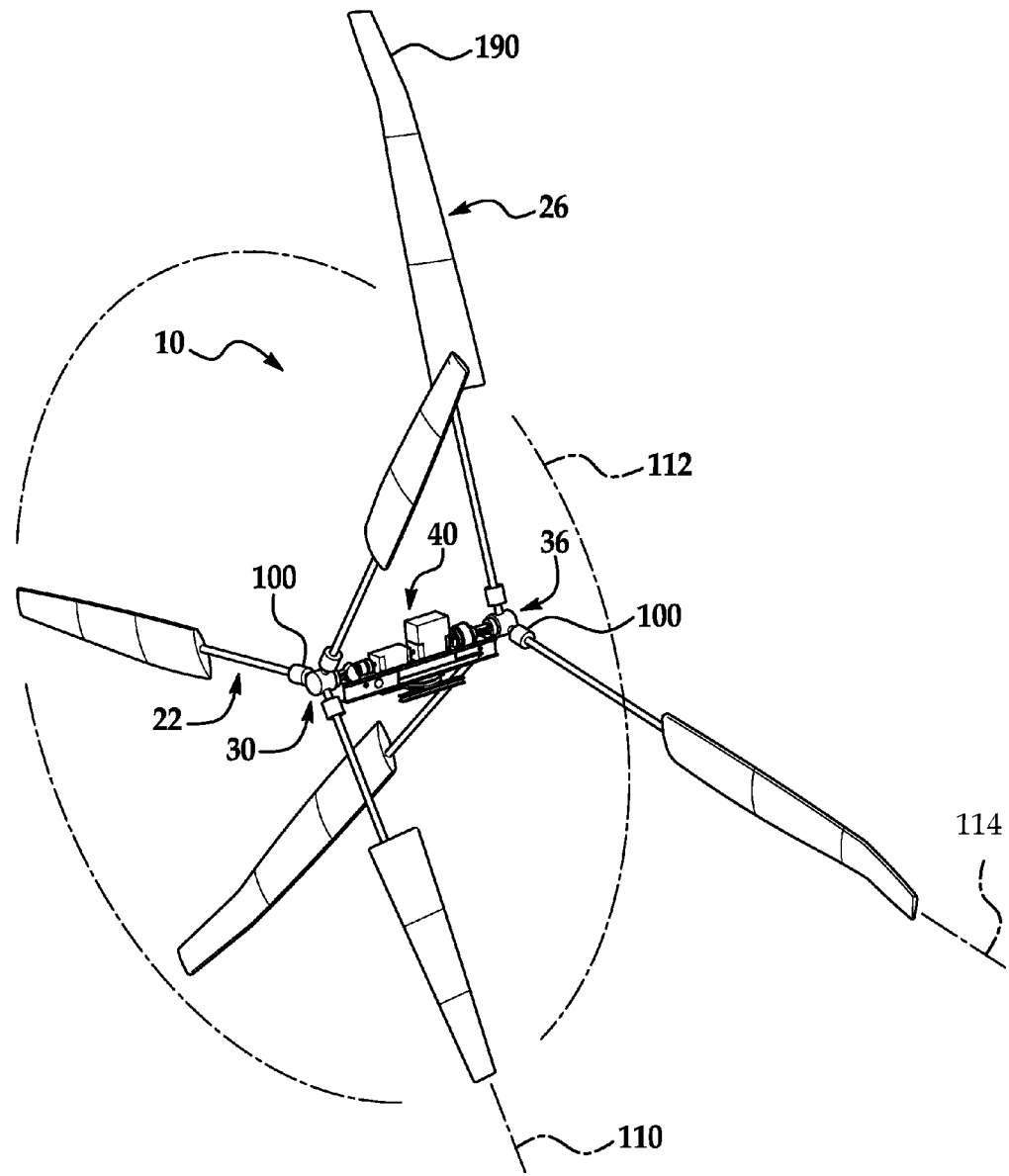
FIG. 2 is a partial perspective view from another vantage point of the example in FIG. 1 showing components housed in the nacelle.

Examples of an inventive wind turbine 10 are shown in FIGS. 1-6. Referring to FIGS. 1 and 2, a wind turbine 10 includes a tower 14 (partially shown) anchored to a foundation (not shown) secured to the earth by means known to those skilled in the field. Tower 14 is typically 200-300 feet in height depending on the application. Secured to the top of the tower is a nacelle 18 housing power transmission equipment 40 described in further detail below. Although the nacelle 18 is illustrated atop tower 14, it is within the scope of the invention that the nacelle 18 could be mounted to other structures or towers of alternate heights and tower constructions.

In the example shown in FIGS. 1 and 2, wind turbine 10 includes a front rotor 22 positioned at one end of the nacelle 18 and a rear rotor 26 positioned at the opposite end of the nacelle 18 as generally illustrated. Hereinafter, front rotor 22 is referred to as first rotor 22, and rear rotor 26 is referred to as second rotor 26. Each rotor 22, 26 includes a respective hub 30, 36 as best seen in FIGS. 1-4.

Figure 3:
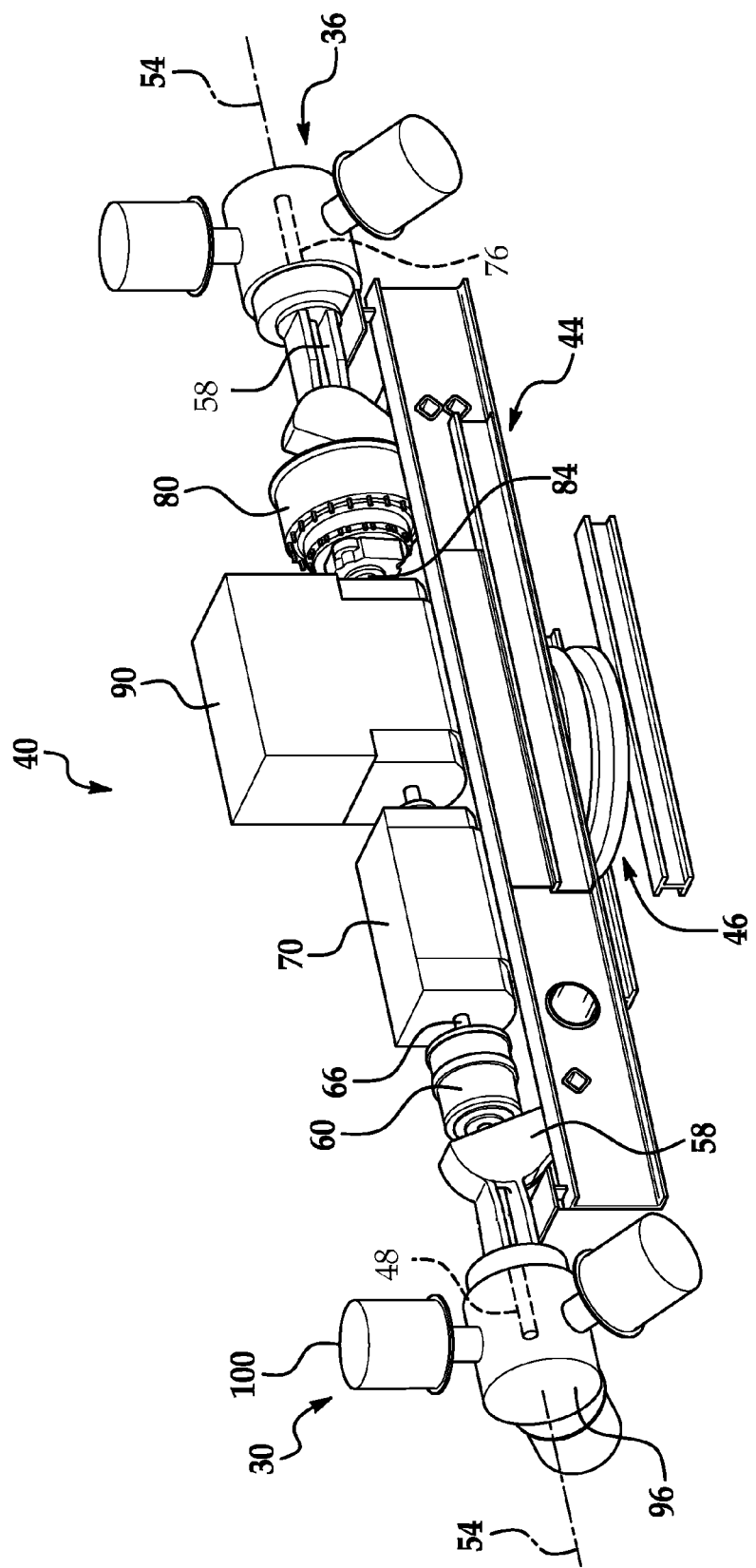
FIG. 3 is an enlarged perspective view of a portion of FIG. 2.

Referring to FIGS. 2 and 3, an example of power transmission equipment 40 for use with the wind turbine 10 is shown. In the example shown, power transmission equipment 40 rests on a base 44 or other structure that may be part of the nacelle 18 or tower 14 support structures. Base 44 as shown includes a turret 46 attached to the base 44 and the top of tower 14. Turret 46 allows the nacelle 18 to rotate relative to tower 14 to orient the rotors 22, 26 toward a wind source for increased efficiency. A first shaft 48 is connected to a first or front hub 30 at a distal end. First shaft 48 extends from first hub 30 and defines an axis of rotation 54. First shaft 48 can be made from steel or other materials suitable for the application known by those skilled in the field. In a preferred example, first shaft 48 is a multi-section shaft connected by couplers (not shown) so as to provide ease of disassembly and/or maintenance of the shaft or components of the power transmission equipment 40. First shaft 48 is preferably, but not necessarily, supported by a spindle housing 58.

First shaft 48 is connected to a first gear assembly 60. In one example, gear assembly 60 is a speed reducer that changes the revolutions per minute from the first shaft 48 to a first or front output shaft 66. In one example, the speed reducer suitably provides a reduction ratio of the speed of the first output shaft 66 to the speed of the first shaft 48 of 5:1. One suitable gear assembly 60 is a planetary gear system. Other gear assemblies and reducers known by those skilled in the field may be used.

In the example illustrated, first output shaft 66 is connected on its opposite end to a dynamic brake 70. Dynamic brake 70 is useful in an operation scenario to transfer and manage excess power that is generated that cannot be efficiently transferred from the turbine 20 through the desired power transfer system. Dynamic brake 70 is preferably an electric form of dynamic brake. One known electric form of dynamic brake incorporates a plurality of resistors in the form of a resistor bank, but others known to those skilled in the art are possible. Other forms of commercially available dynamic brakes, including hydraulic, pneumatic and others, can be incorporated into embodiments of the invention.

On the opposing side of the nacelle 18 from first shaft 48, a second shaft 76 is connected to second or rear hub 36 at a distal end. Second shaft 76 extends from second hub 36 and defines an axis of rotation. In a preferred example, the second shaft 76 axis of rotation is in alignment with the axis of rotation 54 and is supported in a spindle housing 58 as illustrated. It is contemplated that the second shaft 76 axis of rotation may not be aligned with axis of rotation 54 to suit a particular application or alternate electric machine. However, in such a case, additional gear would be required to couple first shaft 48 and second shaft 76 together for rotation. Like first shaft 48, second shaft 76 can comprise a multi-section shaft joined by couplers and is made from steel or other suitable materials.

The opposite end of second shaft 76 is connected to a second or rear output shaft 84 through a second gear assembly 80. In one example, second gear assembly 80 is a speed reducer similar to that described above for first gear assembly 60. In one example, a reduction ratio of the speed of the second output shaft 84 to the speed of the second shaft 48 of 8.68:1 was found suitable. As further described below, in a preferred form, second rotor 26 is designed to rotate about axis of rotation 54 in the opposite direction as first rotor 22. In such a preferred example, second gear 80 also functions to reverse the rotational direction of second shaft 76. A planetary gear assembly is suitable for use as the second gear assembly 80. Other gear assemblies and reducers known by those skilled in the field may be used.

First output shaft 66 and second output shaft 84 connect to an electric generator 90 as generally shown. Through first gear assembly 60 and second gear assembly 80, first output shaft 66 and second output shaft 84 are connected to form a single shaft serving as the generator internal rotor (not shown) to operate relative to the generator internal stator (not shown) to produce electricity as generally known by those skilled in the field. In one example of generator 90, a 1 Megawatt electric generator is used. It is understood that other generator forms, capacities and examples may be used as known by those skilled in the art. The electricity generated by generator 90 is transmitted through conductors down through the nacelle 18 and tower 14 to remote power stations of a grid for storage (generally direct current DC storage) and further distribution, both alternating current AC and DC.

Referring to FIGS. 1-4, one example of first rotor 22 is illustrated in detail. In one example, wind turbine 10 may include only a first rotor 22 connected to the power transmission equipment 40. First rotor 22 includes first hub 30 previously identified. As shown, first hub 30 includes a base 96 connected to first shaft 48. In one example, base 96 includes a rotational speed reducer. A reduction ratio of the speed of rotation of first shaft 48 to the speed of rotation of first shaft 48 of 6.5:1 has been found suitable for some applications. Other ratios may be used to suit the application and requirements. First hub 30 may take other geometric forms, or may include a cover or cap shown in FIG. 4 to conceal and protect the inner components from the environment.

At least two spindles 100 (three shown) connect to the base 96 and extend radially outward from rotational axis 54 as generally shown. In the example illustrated, first rotor 22 includes at least two elongate front blade supports 106 (three shown). Blade supports 106 connect to first hub spindles 100 through a mounting collar and mechanical fasteners (not shown). Blade supports 106 extend radially outward from rotational axis 54, each defining a blade axis 110 as best seen in FIGS. 1, 2 and 4.

In one example of wind turbine 10, blade supports 106 are rigidly fixed to spindles 100 and do not translate or rotate relative to spindles 100 or hub 30. In an alternate example, blade supports 106 are capable of rotating relative to spindles 100 about blade axis 110. In this example, spindles 100 would include a bearing (not shown) within spindle 100 to secure blade support 106 while permitting rotation about blade axis 110. In a preferred example, blade support 106 may be freely rotatable about blade axis 110 through a predetermined and limited angle of rotation through mechanical stops or barriers similar to that described later with respect to the blade sections. Rotation of blade support 106 is passive in the illustrated embodiments. That is, no electrical or electro-mechanical mechanisms impart a force or energy to forcibly rotate blade support 106 relative to the respective spindle 100. Rather, the force that produces rotation of blade support 106 relative to spindle 100 is solely the energy or force of a wind source 134 acting on wind turbine 10 and particular blade of first rotor 22 as best seen in FIG. 4.

In one example of first rotor 22, blade supports 106 radially extend about 53 feet (16.15 meters) from the rotational axis 54 and define a geometric plane 112 through which part, or substantially all, of blade supports 106 lie in and rotate through in operation. In one example, blade supports 106 are hollow, rigid tubular rods made from steel. Other lengths and numbers of blade supports 106, as well as different materials and mechanical connections may be used without deviating from the invention. In one example, blade supports 106 are made from composite materials such as carbon fiber reinforced resin.

Figure 4:
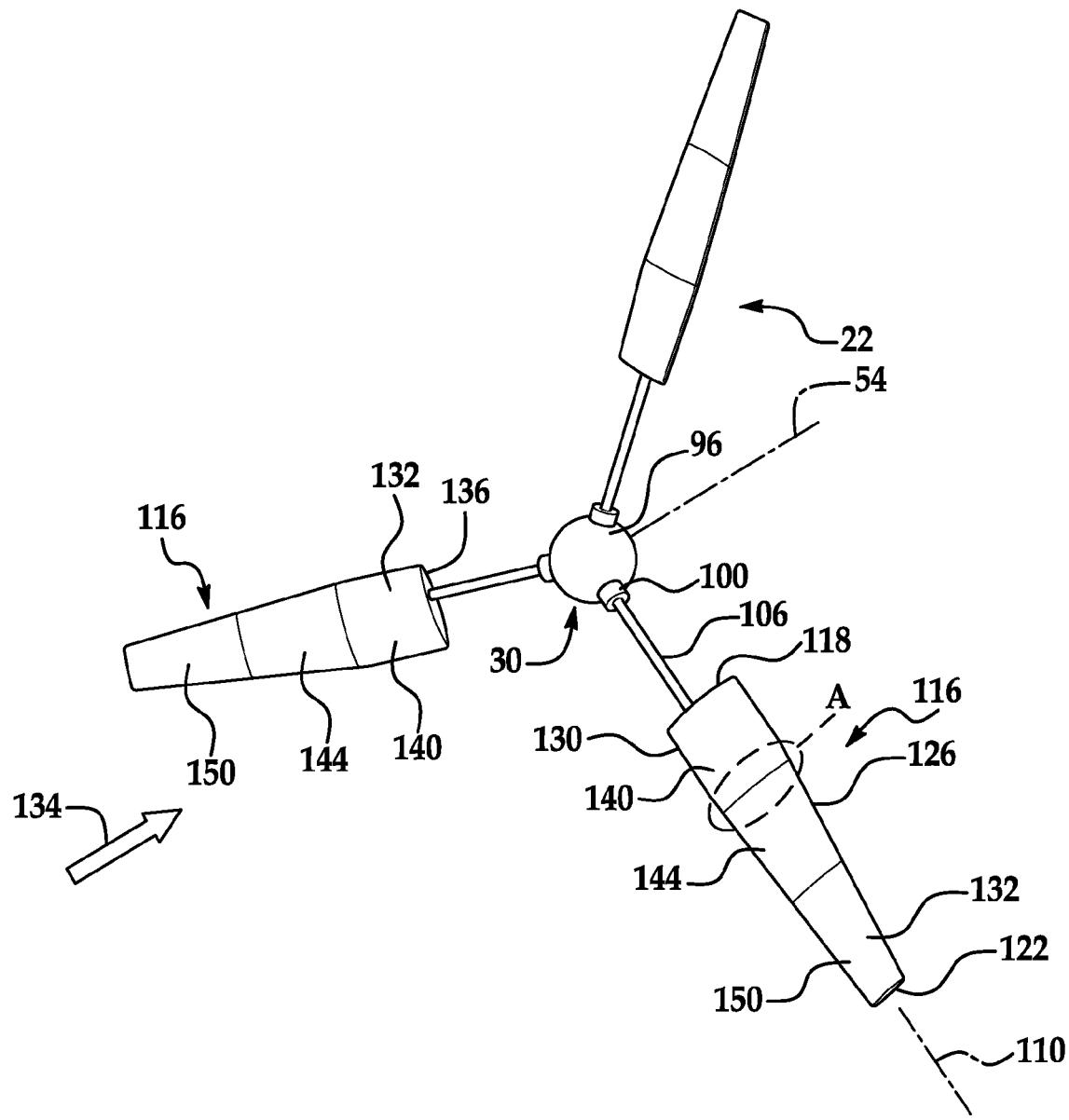
FIG. 4 is an enlarged and alternate perspective view of a portion of the first or front rotor shown in FIG. 2.

As best seen in FIGS. 2 and 4, an example of first rotor 22 includes three blades 116 connected to a respective blade support 106 and extending radially outward along blade axis 110. As illustrated in FIG. 4, blades 116 include an inner end 118 and a radially distant outer or distal end 122. Each blade 116 includes a leading or cutting edge 130, which is the first portion to contact air in the direction of rotation (clockwise about rotational axis 54 in the example shown), and a trailing edge 126 on the other side of the blade 116. The ends 118, 122 and edges 126, 130 define a blade wind bearing surface 132 and an opposing back surface 136 on the opposite side of the blade 116. Wind bearing surface 132 substantially faces toward wind source 134.

In the illustrated example of first rotor 22, the distance between the rotational axis 54 and blade inner end 118 is about 18 feet (5.48 meters) and the distance between blade inner end 118 and distal end 122 is about 35 feet (10.59 meters). In a desirable example, blades 116 are made from reinforced resin with a polycarbonate clear coat. The outer skin defines a substantially hollow cavity interior having internal reinforcing ribs (not shown) as needed to meet the particular application and performance requirements. Other materials such as lightweight ferrous and non-ferrous metals, other composites, and other materials and constructions may be used as known by those skilled in the field. Although three blades 116 for first rotor 22 are shown, it is understood that a greater number of blade supports 106 and associated blades 116 may be used to suit particular application and performance requirements.

In one example of wind turbine 10, first rotor blades 116, when assembled and connected to the respective blade support 106, form a single piece blade unit that is rigidly fixed to blade support 106. That is, in this example, blade 116 does not translate or rotate relative to blade support 106. In an alternate example, blade support 106 supporting the single unit fixed blade is capable of rotating about blade axis 110 with respect to first hub spindle 100 as previously described. In this example, rotation of blade support 106 adjusts, modifies or varies the pitch of the respective blade to optimize engagement with the wind source 134 and increase the ultimate power output of generator 90 and/or increase the efficiency with which power is generated. As noted, under such an example of passive rotation of blade support 106, the force of the wind source 134 affects the amount of blade pitch without active controls or other artificially generated (e.g., electrical or mechanical) forces, thereby increasing the efficiency of the wind turbine 10.

In an alternate example of a single rotor assembly, single blade unit configuration, a blade 116 may rotate as a single unit relative to blade support 106 about blade axis 110 through use of bearings substantially the same or similar to that shown in FIG. 6 as further described below.

Figure 5:
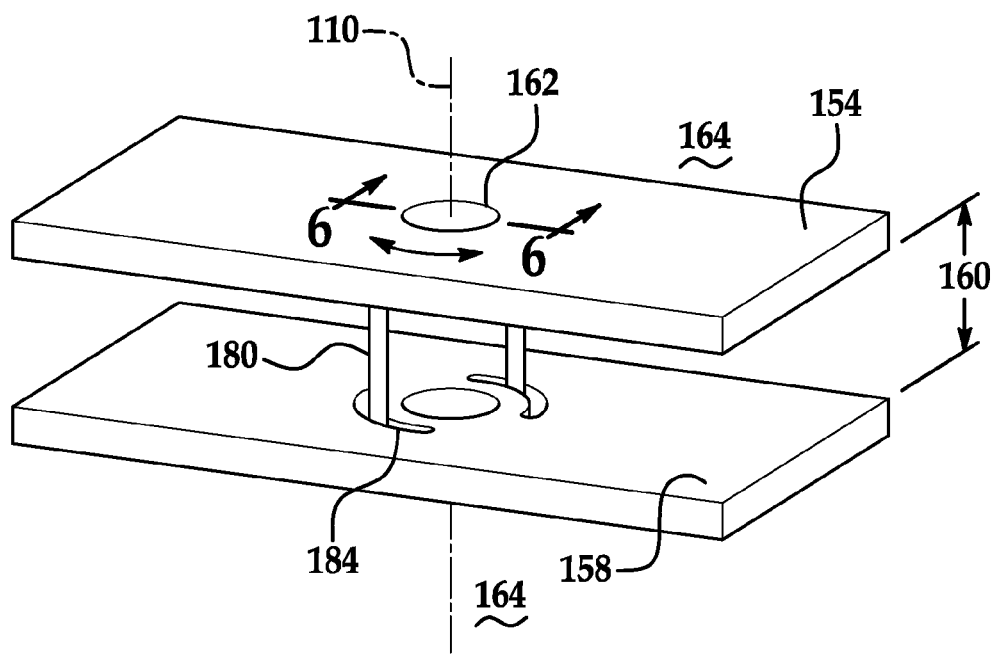
FIG. 5 is an enlarged partial perspective view of a portion of a blade identified as A in FIG. 4.
Figure 6:
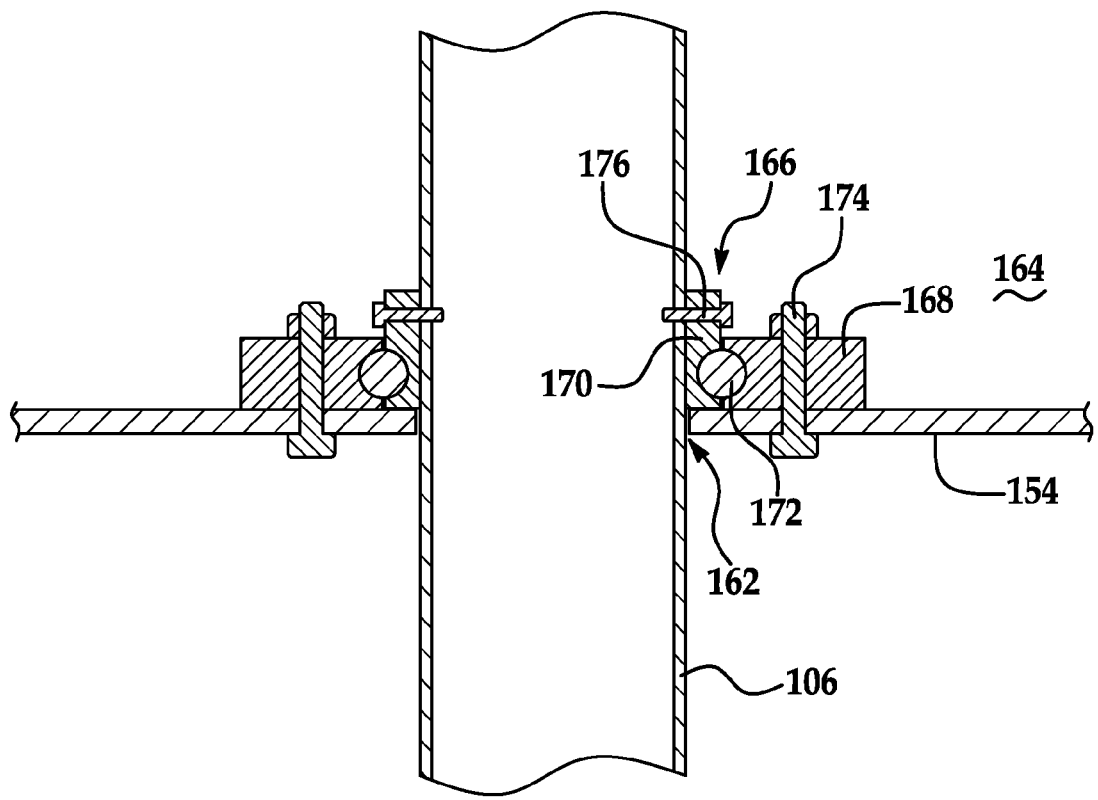
FIG. 6 is a section taken along lines 6-6 in FIG. 5.

An alternate example of wind turbine 10 and of varying the pitch of blades 116 relative to a wind source 134 is shown in FIGS. 4-6. Referring to FIG. 4, each first rotor blade 116 are divided or separated into at least two sections (three sections shown) that are able to rotate relative to blade support 106 about blade axis 110. In one example best seen in FIG. 5, the blade sections may rotate with respect to the other blade sections. In this example, blade 116 consists of a first section 140, a second section 144 positioned radially outward from rotational axis 54 along blade support 106 and a third section 150 positioned radially outward of second section 144.

Unlike the previously discussed example where blade 116 is rigidly fixed to blade support 106, each of first 140, second 144 and third 150 sections are rotatably connected to blade support 106 to permit rotation of the respective section about support 106 and blade axis 110 independent of the adjacent blade section(s). Such rotation of the individual section(s) 140, 144, 150 changes the twist of the blade 116. As best seen in FIGS. 4 and 5, each section includes a first end cap 154 radially closer to the rotational axis 54 and a second end cap 158 radially distant from the first end cap 154. The first and second end caps 154, 158, in combination with the previously described portions of the blade wind bearing surface 132 and back surface 136, substantially provide a closed section defining a hollow cavity interior 164 within the blade 116.

As best seen in FIG. 6, the individual blade sections are rotatably connected to support 106 through a series of bearings 166. An example of one bearing 166 includes an outer race 168, an inner race 170 and a ball bearing 172 positioned on the inside of a respective section (second section 144 as illustrated in FIG. 6) in cavity 164. Outer race 168 is connected to end cap 154, and the inner race 170 is connected to the blade support 106 through fasteners 174 and 176, respectively. It is understood that other forms of bearings and ways to enable rotation of the sections about support 106 and blade axis 110 may be used. It is further contemplated that bearing 166 could be positioned in other orientations, for example other than in the interior of the blade section.

In one example of separate blade sections rotatable with respect to one another, a clearance or gap 160 is used between adjacent blade sections as best seen in FIG. 5. This example gap 160 serves several purposes, for example, reducing frictional contact between adjacent sections as they are capable of rotation relative to one another and providing clearance for additional components positioned between the sections. For example, bearings 166 may be positioned outside blade cavity 164 between adjacent sections. It is desirable for aerodynamics, however, that clearance or gap 160 be minimized.

Also illustrated in FIG. 5 is an example of a structure to control the amount or degree of angular movement about blade axis 110 that can take place between adjacent blade sections. In the example, blade support 106 passes through apertures 162. As shown, the apertures are associated with the second end cap 158 of the first section 140 and the first end cap 154 of the second blade section 144 are shown. To limit or control the maximum rotation about blade axis 110 of second section 144 relative to first section 140, two pins 180 are secured to first end cap 154 and extend axially down into angular slots 184 as generally shown. On rotation of second section 144 relative to first section 140, a predetermined amount of angular differentiation is achieved through a hard mechanical stop of the pins 180 at the end of the slots 184. Pins 180 may be made from ferrous or non-ferrous metals to suit the particular application, or other materials known by those skilled in the field.

In one preferred example of angular slots 184 and pins 180, a nominal blade section blade pitch position is established, for example at the time of installation, wherein pin 180 is positioned in the approximate center of the respective slots 184 (in the middle portion between the two extreme ends or stops in the slots as shown in FIG. 5). In this example, the predetermined angular movement of pins 180 in the respective slot 184 is plus and minus 30 degrees about blade axis 110. In other words, the blade section predetermined angular movement or range of movement is clockwise 30 degrees or counterclockwise 30 degrees about blade axis 110 from the nominal, aligned position described and illustrated.

Although FIG. 5 illustrates where the pins 180 and slots 184 are positioned or integral within the end caps 154 and 158 of adjacent blade sections, these structures can take other forms, for example a separate plate or collar positioned in the gap 160 that is not connected to the adjacent section. Structures other than the pins 180 and slots 184 can be used as stops.

In one example, the axial lengths of the individual first 140, second 144 and third 150 sections between first 154 and second 158 caps along blade axis 110 are not equal to reduce potential harmonic motion conditions or effects. It is understood that equal length sections may also be used with that consideration in mind or otherwise addressed through other measures.

One way of determining the axial lengths of the individual sections of blade 116 is to consider the blade twist. Conventionally, wind turbine blades are not "flat" in their geometry. They are designed with a twist such that the ratio of the rotational speed of the tip versus the wind speed is 8:1 so that a blade has a different angle of attack along its length for the same wind source. For example, the blade at one-eighth of the axial length from the tip experiences only a one degree difference in the angle of attack from that at the tip, while the innermost eighth of the blade experiences a 45 degree difference in the angle of attack. In theory, a large number of blade sections is desirable such that the change in the angle of attack over the length of each section would be minimized and roughly equal to the other sections. Such a design would provide the most efficient use of the wind while minimizing air turbulence caused by the discontinuity of the blade at each joint between blade sections. In practice, however, manufacture of multiple sections is difficult, and multiple sections increase part count and maintenance expenses. Balancing these consideration results in one possible design described herein where first 140, second 144 and third 150 blade sections are used. In this example, first blade section 140 has an axial length of about 2.75/8 of the entire blade length, second blade section 144 has an axial length of about 2.25/8 of the entire blade length, and third blade section 150 has an axial length of about 3/8 of the entire blade length.

In another example where first 140, second 144 and third 150 blade sections are used, and where the axial lengths of such sections vary from one another, the surface areas of the blade wind bearing surfaces 132 of each section may remain substantially the same through changes in the shapes of the blade sections as the blade extends radially outward. That is, conventionally the end of the blade 116 becomes axially narrower in the direction transverse to the blade axis 110 such that the tip of the blade 116 is roughly half the axial width of its root. As shown in the example in FIG. 4, in order to keep the wind bearing surface substantially equal to that of the first section 140, the axial length of third section 150 increases as generally illustrated. It is understood that the surface areas of the wind bearing surfaces 132 may be different for each section. In the exemplary design described in the previous paragraph, for example, the blade wind bearing surfaces 132 of first 140, second 144 and third 150 blade sections vary by only about 20%.

Although illustrated with three separate sections, first 140, second 144 and third 150, it is understood that a fewer number or greater number of sections may be used to suit the particular application or performance requirements.

In one example of operation, on wind source 134 acting on front rotor blade wind bearing surfaces 132, blade 116 or respective blade sections 140, 144 and/or 150 will rotate about blade support 106 to adjust the blade twist to the particular wind source characteristics, for example, changes in wind speed or direction. Due to the passive nature of the permitted rotation, the blade or blade sections freely rotate with respect to blade support 106. In the example using pins 180 and slots 184 shown in FIG. 5, the pins 180 will "float" or freely move within the slot to continuously adjust the blade or blade section pitch based on the wind source 134 without further controls or other generated stimulus from the wind turbine 10. In the alternate example described, the blade sections 140, 144 and/or 150 will further rotate relative to one another for added adjustment to the blade pitch as they rotate about axis 54.

In the example shown in FIGS. 1 and 2 and described with reference to power transmission equipment 40 above, wind turbine 10 may include a second or rear rotor 26. Second rotor 26 can include the same construction and configuration as described for first rotor 22. For example and without limitation, second or rear rotor blades 128, like first rotor blades 116, are of the configuration where each blade 128 is one unit fixed to a respective blade support 108 and wherein the blade supports 108 themselves rotate about blade axis 114 relative to the second hub 36. In the alternative as described above with respect to first rotor blades 116, blades 128 include separate blade sections that are capable of rotational movement with respect to the respective blade support 108 and one another through the structures described. Construction of second hub 36 can be the same as first hub 30.

One difference between the first rotor 22 and the second rotor 26 is that, in a preferred configuration, second rotor 26 rotates in the opposite direction about rotational axis 54 relative to first rotor 22. In the example shown in FIGS. 1 and 2, the second rotor 26 rotates in a counter-clockwise direction, and thus the leading edge is on the opposite side of the blade when compared to blades of the first rotor 22. The blade pitch of the second rotor 26 is also different from that the first rotor 22 in this configuration due to the opposite rotation. This counter-rotation between the first and second rotors 22, 26 provides the benefit of reducing the torsional forces and stresses on the nacelle 18 and tower 14 through at least partial cancellation of opposite forces.

As shown, second rotor 26 has a second set of blades 128 longer than blades 116 of the first rotor 22 and that extend past the distal or radially-extreme end of the blades 116 of the first rotor 22. In one example, the second set of blades 128 extend from about 33 feet (10.05 meters) from the axis of rotation 54 to the distal end to terminate at 85 feet (25.9 meters). In these lengths and orientations, there is a blade sweep overlap between the blades of the first rotor 22 and those of the second rotor 26 of about 20 feet (6.05 meters), which is the distance between the radially lowest end of the second set of blades 128 and the radially distant or top of the first set of blades 116. This overlap is useful to reduce the amount of wind that passes from the first rotor 22 rearward toward the second rotor 26 from escaping or passing radially under the radially lowest portion of the second rotor blades 128. That is, the vortex from the first set of (front) blades 116 is at least partly captured by the second set of (rear) blades 128.

Through having the second rotor 26 and the described orientation of the blades with respect to one another, the second rotor 26 provides additional conversion of wind energy into electricity over prior single blade assembly designs. It has been calculated that by having a second rotor 26 as described that efficiency increases approximately 3-5%. This is due in part to the second rotor 26 being able to further act on the vortex of wind that is created from the wind source 134 passing the first rotor assembly 22. In the two rotor configuration illustrated wherein each of the blades 116, 128 each have three sections (140, 144 and 150), in operation, five of the six blade sections of adjacent front and rear blades 116, 128 are passing through or cutting new or uninterrupted wind from wind source 134. Where rotation of the sections 140, 144 and 150 is both passive and independent, the twist of a blade, particularly a blade 128 of the second rotor 26, can be such that the first blade section 140 has a positive angle of rotation relative to equilibrium, while the third blade section has a negative angle of rotation relative to equilibrium, with the second blade section 144 having an angle of rotation between those two values.

As best seen in FIG. 2, one example of the second rotor 26 includes an angled blade portion 190 near the distal end of blades 128. As illustrated, this angled portion 190 is biased toward the first rotor 22. A suitable angle of portion 190 from the remaining portion of the blade 128 is up to about 40 degrees with respect to the blade axis 110, although other angles may be used depending on the application and performance requirements. In the example where blades 128 include multiple sections, angled portion 190 is preferably not at a joint or gap 160 between adjacent sections, but may be depending on the application and performance requirements.

In operation, on input of wind energy from a wind source 134, the wind first contacts the wind bearing surface 132 of blades 116 of first rotor 22. Due to the lift provided by the wind, rotation of the blades and hub 30 in a clockwise direction about rotational axis 54 occurs. The hub 30 adjusts the rotations per minute by the predetermined ratio and rotates first shaft 48, which is an input shaft for first gear assembly 60. First gear assembly 60 further adjusts the rotations per minute by a predetermined ratio as reflected by the rotation of first output shaft 66. First output shaft passes through dynamic brake 70 and in turn rotates a rotor of generator 90 to induce a voltage in the stator of generator 90 to generate electricity for transmission through conductors out of the wind turbine 10 to remote locations for further storage or distribution as mentioned previously.

As described above, the pitch of blades 116 of first rotor 22 passively adjust according to the wind conditions at the point of contact with the respective blade wind bearing surface 132. The blade 116 or respective blade sections, 140, 144 and 150, will rotate relative to blade support 106, and in the examples illustrated, with respect to adjacent blade sections about blade axis 110. Independent passive variation of the blade pitch, and optionally the geometry (twist) occurs continuously throughout the rotation of the rotor about rotational axis 54 based solely on the wind conditions provided by wind source 134.

In operation, the two blade assembly example produces rotations of both first hub 30 and second hub 36, preferably in opposite directions about rotational axis 54. Rotation of the respective hubs and adjustment in rotation speeds through gear assemblies rotates the respective shafts and output shafts leading from both first and second rotor assemblies 22, 26 to the generator 90 to produce electricity. Through use of first and second rotor assemblies 22, 26 in the general orientation shown, there is no need for a typical transversely oriented wind vane downwind of a single rotor assembly to properly turn that assembly toward the direction of wind source 134.

In operation, where a variation in blade pitch is desired to accommodate variations in wind speed and direction, several optional methods have been disclosed. The blades 116, 128 may be configured to be a single unit fixed to a rotatable blade support 106, 108, a multi-section blade wherein the blade sections are capable of rotating with respect to one another, or an example where the blade includes both the rotatable blade sections as well as a rotatable blade support 106, 108. In each of the examples, the individual blade sections and/or the blade support 106, 108 are capable of independently and passively rotating through their predefined angles of movement to adjust or accommodate changing wind conditions. This independent passive adaptability, for example to accommodate often different wind speeds and directions at a lower elevation of the blade 116, 128 rotation versus wind speed and direction at the apex of blade 116, 128 rotation about rotational axis 54 at any given moment, provides a significant advantage over prior designs by increasing electricity output and efficiency of operation. Note that although all blade sections of a multi-section blade are described in the example as freely rotating, one blade section of the three, or more blade sections where there are more than three blade sections, could be fixed to the blade support 106, 108.

Figure 7:
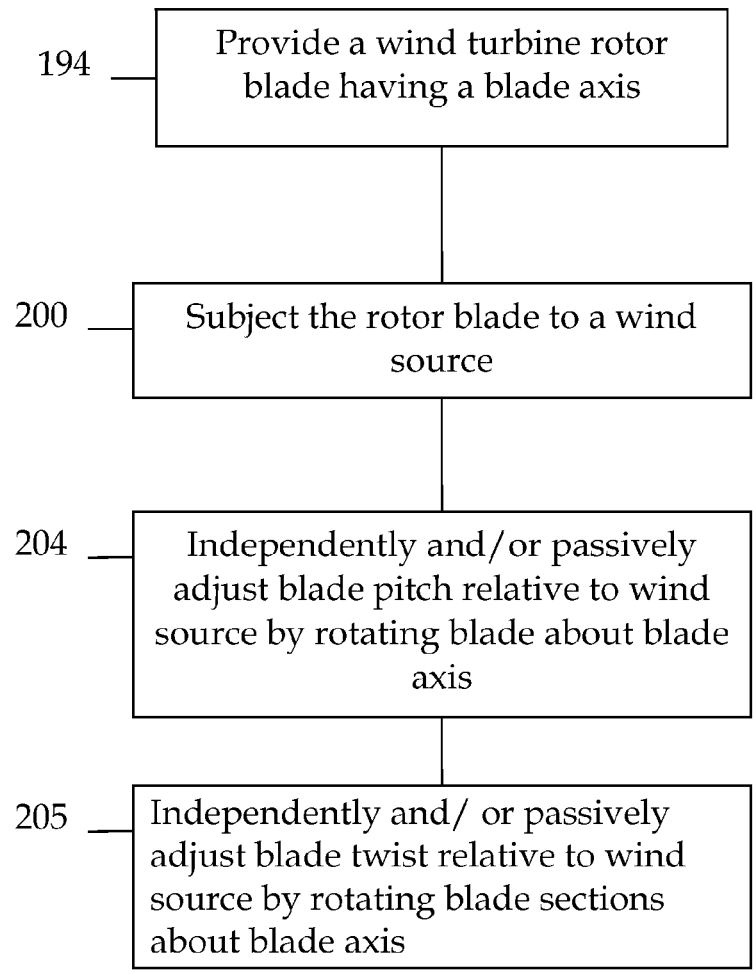
FIG. 7 is a flow chart schematically illustrating an example of a method to vary the pitch of a wind turbine rotor blade.

A method for varying the pitch of wind turbine blades is schematically shown in FIG. 7. In a first step 194, a wind turbine rotor blade is provided having a blade axis. As shown in the examples in FIGS. 1, 2 and 4, the blade is 116, and blade axis is 110. As explained in the many examples above, blade 116 may be a unitary blade or be made from at least two sections (three shown 140, 144 and 150). In the examples shown, the blade 116 is connected to a blade support 106.

In a second step 200, the blade 116 is subjected to a wind source 134 shown in FIG. 4. As described above, the wind source imparts a force on the wind bearing surface 132 of the blade substantially facing the wind source. As is known, the speed and direction of wind changes from moment to moment and can vary greatly depending on the distance from the ground or if large objects such as houses, trees or other natural barriers such as valleys or hills are nearby.

In a third step 204, the blade is passively adjusted through rotation of the blade about the blade axis to vary the pitch of the blade relative to the wind source 134. As described in the many examples above, passive variation of the blade pitch through rotation of the blade, or blade sections, about the blade axis occurs solely through exertion of force on the blade provided by the wind source and not through artificial forces such as motors, force inducers, sensors or other stimulus generated by the wind turbine or accessories thereof. As seen at next step 205, the blade twist can be adjusted when blade sections exist. The passive adjustment occurs continuously throughout rotation of the respective rotor blades about a central rotational axis of the wind turbine rotor to optimize blade pitch/twist relative to the present wind source at any given moment throughout each blade's complete rotation. When multiple blades are used, each can be both passively and independently adjusted.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wind turbine comprising:
   a first rotor connected to a first shaft and rotatable about an axis of rotation, the first rotor further comprising:
      a first elongate blade support connected to the first shaft, radially extending from the first shaft and defining a first longitudinal blade axis;
      a first rotor blade connected to the first elongate blade support, the first rotor blade radially extending along the first longitudinal blade axis, and the first rotor blade including at least a first blade section and a second blade section, the first blade section of the first rotor blade mounted on a radially-outermost position on the first elongate blade support relative to a mounting position of the second blade section of the first rotor blade and configured so that a twist of the first rotor blade is optimized by passively rotating at least the first blade section of the first rotor blade about the first longitudinal axis at a fixed distance from the first shaft and the first rotor blade further including:
      a stop fixed to the elongate rotor blade support and defining at least one arcuate slot concentrically positioned about the longitudinal blade axis; and
      a pin extending into the arcuate slot to limit rotation of the rotor blade to the defined angle of rotation relative to the stop;

a second elongate blade support connected to the first shaft and angularly spaced from the first elongate blade support about the axis of rotation; and a second rotor blade connected to the second elongate blade support, the second rotor blade radially extending from a second longitudinal axis, the second rotor blade including at least a first blade section and a second blade section, the first blade section of the second rotor blade mounted on a radially-outermost position on the second elongate blade support relative to a mounting position of the second blade section of the second rotor blade and configured so that a twist of the second rotor blade is optimized by passively rotating at least the first blade section of the second rotor blade about the second longitudinal axis at a fixed distance from the first shaft;

a nacelle including an electric generator connected to the first shaft; and a tower supporting the nacelle.

2. The wind turbine according to claim 1 wherein the first rotor blade is configured so that the twist of the first rotor blade is optimized by passively rotating the first blade section of the first rotor blade about the first longitudinal blade axis through a defined angular range.

3. The wind turbine according to claim 1 wherein the first rotor blade is configured to optimize the twist of the first rotor blade by passively rotating the first blade section of the first rotor blade independently of the second blade section of the first rotor blade.

4. The wind turbine according to claim 1, wherein the first rotor is a front rotor, the first shaft is a front shaft, the first elongate blade support is a first front elongate blade support, the second elongate blade support is a second front elongate blade support, the first rotor blade is a first front rotor blade, and the second rotor blade is a second front rotor blade, the wind turbine further comprising:

an opposing rear rotor separated from the front rotor along the axis of rotation and connected to a rear shaft connected to the electrical generator, the rear rotor further comprising a first rear elongate blade support of the rear rotor connected to the rear shaft, the first rear elongate blade support radially extending from the rear shaft and defining a first rear longitudinal blade axis, wherein a first rear rotor blade is connected to the first rear elongate blade support, the first rear rotor blade radially extending from the first rear longitudinal blade axis.

5. The wind turbine according to claim 4 wherein the first rear rotor blade comprises a distal end portion that extends radially further from the axis of rotation than a radially distal end of the first front rotor blade.

6. The wind turbine according to claim 5 wherein the distal end portion of the first rear rotor blade is angularly positioned with respect to the first rear longitudinal blade axis in a direction toward the front rotor along the axis of rotation.

7. The wind turbine according to claim 1 wherein the nacelle further comprises:

a first gear assembly connected to the first shaft and to a first output shaft, the first gear assembly configured to provide a speed of rotation of the first output shaft different from a speed of rotation of the first shaft; and a dynamic brake connected to the first output shaft; wherein the electric generator is connected to the first output shaft.

8. A wind turbine comprising:

a front rotor connected to a front shaft and rotatable about an axis of rotation, the front rotor further comprising:
a front hub connected to the front shaft;

a first front elongate blade support connected to the front hub, the first front elongate blade support radially extending from the front hub and defining a first front longitudinal blade axis;

a first front rotor blade connected to the first front elongate blade support, the first front rotor blade extending radially outward along the first front longitudinal blade axis, the first front rotor blade configured so that a twist of the first front rotor blade is optimized by passively rotating a first blade section of the first front rotor blade about the first front longitudinal blade axis and the first rotor blade further including:

a stop fixed to the elongate rotor blade support and defining at least one arcuate slot concentrically positioned about the longitudinal blade axis; and a pin extending into the arcuate slot to limit rotation of the rotor blade to the defined angle of rotation relative to the stop;

a second front elongate blade support connected to the front hub, the second front elongate blade support radially extending from the front hub and defining a second front longitudinal blade axis; and a second front rotor blade connected to the second front elongate blade support, the second front rotor blade extending radially outward along the second front longitudinal blade axis, the second front rotor blade configured so that a twist of the second front rotor blade is optimized by passively rotating a first blade section of the second front rotor blade about the second front longitudinal blade axis;

a rear rotor positioned longitudinally distant from the front rotor along the axis of rotation, the rear rotor connected to a rear shaft and rotatable about the axis of rotation in an opposite direction from the front rotor, the rear rotor further comprising:

a rear hub connected to the rear shaft;

a first rear elongate blade support connected to the rear hub, the first rear elongate blade support radially extending from the rear hub and defining a first rear longitudinal blade axis;

a first rear rotor blade connected to the first rear elongate blade support, the first rear rotor blade extending radially outward along the first rear longitudinal blade axis, the first rear rotor blade configured so that a twist of the first rear rotor blade is optimized by passively rotating a first blade section of the first rear rotor blade about the first rear longitudinal blade axis, and the first rear rotor blade including a distal end that extends radially further from the axis of rotation than a distal end of the first front rotor blade and a distal end of the second front rotor blade to form a blade sweep overlap and that is angularly positioned relative to the first rear longitudinal blade axis in a direction toward the front rotor relative to a portion of the first rear rotor blade;

a second rear elongate blade support connected to the rear hub, the second rear elongate blade support radially extending from the rear hub and defining a second rear longitudinal blade axis; and a second rear rotor blade connected to the second rear elongate blade support, the second rear rotor blade extending radially outward along the second rear longitudinal blade axis, the second rear rotor blade configured so that a twist of the second rear rotor blade is optimized by passively rotating a first blade section of the second rear rotor blade about the second rear longitudinal blade axis, the second rear rotor blade including a distal end that extends radially further from the axis of rotation than the distal end of the first front rotor blade and the distal end of the second front rotor blade to form a blade sweep overlap and that is angularly positioned relative to the second rear longitudinal blade axis in a direction toward the front rotor relative to a portion of the second rear rotor blade;

a nacelle having a first gear assembly connected to the first shaft, a second gear assembly connected to the second shaft, a first output shaft connected to first gear assembly, a second output shaft connected to the second gear assembly, and a dynamic brake and an electric generator respectively connected to the first output shaft and the second output shaft; and a tower supporting the nacelle.

9. The wind turbine according to claim 8 wherein the first front elongate blade support is passively rotatable about the first front longitudinal blade axis to optimize a pitch of the first front rotor blade independently of a pitch of the second front rotor blade, a pitch of the first rear rotor blade, and a pitch of the second rear rotor blade;

the second front elongate blade support passively rotatable about the second front longitudinal blade axis to optimize the pitch of the second front rotor blade independently of the pitch of the first front rotor blade, the pitch of the first rear rotor blade, and the pitch of the second rear rotor blade;

the first rear elongate blade support is passively rotatable about the first rear longitudinal blade axis to optimize the pitch of the first rear rotor blade independently of the pitch of the first front rotor blade, the pitch of the second front rotor blade, and the pitch of the second rear rotor blade; and the second rear elongate blade support is passively rotatable about the second rear longitudinal blade axis to optimize the pitch of the second rear rotor blade independently of the pitch of the first front rotor blade, the pitch of the second front rotor blade, and the pitch of the first rear rotor blade.

10. A variable orientation wind turbine blade comprising:

an elongate rotor blade support defining a longitudinal blade axis;

a rotor blade connected to the elongate rotor blade support and extending radially outward along the longitudinal blade axis, the rotor blade configured so that a twist of the rotor blade is optimized by passively rotating a first blade section of the rotor blade about the longitudinal blade axis through a defined angle of rotation at a fixed distance along the longitudinal blade axis, the first blade section being a radially-outermost blade section of a plurality of blade sections forming the rotor blade that are located along the elongate rotor blade support;

a stop fixed to the elongate rotor blade support and defining at least one arcuate slot concentrically positioned about the longitudinal blade axis; and a pin extending into the arcuate slot to limit rotation of the rotor blade to the defined angle of rotation relative to the stop.

11. The variable orientation wind turbine blade of claim 10 wherein the pin is fixedly connected to and extends from an end of the rotor blade in a direction substantially parallel to the longitudinal blade axis.

12. The variable orientation wind turbine blade of claim 10 wherein the first blade section of the rotor blade is independently rotatable with respect to another blade section of the rotor blade.

13. The variable orientation wind turbine blade of claim 10 wherein the rotor blade is configured so that the twist of the rotor blade is optimized by passively rotating a second blade section of the rotor blade about the longitudinal blade axis.

14. The variable orientation wind turbine blade of claim 13 wherein the first blade section is configured to passively rotate about the longitudinal blade axis by a first degree of rotation, and the second blade section is configured to passively rotate about the longitudinal blade axis by a second degree of rotation, and wherein the first degree of rotation is independent of the second degree of rotation.

15. The variable orientation wind turbine blade of claim 10 wherein the elongate rotor blade support is configured to passively rotate about the longitudinal blade axis to optimize the pitch of the rotor blade independently of a pitch of another rotor blade.

16. The wind turbine according to claim 1 wherein at least a portion of the first rotor blade is fixedly connected to the first elongate blade support.

17. The wind turbine according to claim 1 wherein the first rotor blade is configured so that the twist of the first rotor blade is continuously optimized throughout a revolution of the first rotor blade about the axis of rotation.

18. The wind turbine of claim 8 wherein the first blade section of the first front rotor blade is a radially-outermost blade section of a plurality of blade sections forming the first front rotor blade and is attached to the first front elongate blade support so as to rotate about the first front longitudinal blade axis at a fixed distance along the first front elongate blade support;

wherein the first blade section of the second front rotor blade is a radially-outermost blade section of a plurality of blade sections forming the second front rotor blade and is attached to the second front elongate blade support so as to rotate about the second front longitudinal blade axis at a fixed distance along the second front elongate blade support;

wherein the first blade section of the first rear rotor blade is one of a plurality of blade sections forming the first rear rotor blade and is located at the distal end of the first rear rotor blade, the first blade section of the first rear rotor blade attached to the first rear elongate blade support so as to rotate about the first rear longitudinal blade axis at a first distance along the first rear elongate blade support; and wherein the first blade section of the second rear rotor blade is one of a plurality of blade sections forming the second rear rotor blade and is located the distal end of the second rear rotor blade, the first blade section of the second rear rotor blade attached to the second rear elongate blade support so as to rotate about the second rear longitudinal blade axis at a first distance along the second rear elongate blade support.

* * * * *